United States Patent [19]

Santoso et al.

[11] Patent Number: 4,530,881

[45] Date of Patent: Jul. 23, 1985

[54] FLUOROELASTOMER-BASED FRICTION MATERIAL HAVING IMPROVED FRICTIONAL PROPERTIES

[75] Inventors: Muljadi Santoso, Leominster, Mass.; John N. Anderson, Monroe, Conn.

[73] Assignee: Raymark Industries, Inc., Trumbull, Conn.

[21] Appl. No.: 469,147

[22] Filed: Feb. 24, 1983

[51] Int. Cl.³ .................... B32B 27/00; B32B 5/16
[52] U.S. Cl. .................... 428/421; 428/422; 428/463; 523/152; 523/153; 523/159; 524/456; 524/545; 524/546
[58] Field of Search .......... 428/422, 421, 463; 524/546, 545, 456; 523/153, 152, 159

[56] References Cited

U.S. PATENT DOCUMENTS

| | | | |
|---|---|---|---|
| 3,007,890 | 11/1961 | Twiss | 523/159 |
| 3,314,916 | 4/1967 | Cupery | 524/546 |
| 3,634,309 | 1/1972 | Palumbo | 524/546 |
| 3,879,302 | 4/1975 | Reick | 524/546 |
| 3,898,361 | 8/1975 | Bjerk | 523/153 |
| 4,042,085 | 8/1977 | Bjerk | 428/421 |
| 4,045,402 | 8/1977 | Bjerk | 428/421 |
| 4,051,100 | 9/1977 | Bjerk | 428/421 |
| 4,131,590 | 12/1978 | DeFrank | 428/213 |
| 4,373,038 | 2/1983 | Moraw | 524/456 |
| 4,400,434 | 8/1983 | Santoso | 428/422 |
| 4,408,007 | 10/1983 | Kuhls | 524/546 |
| 4,417,019 | 11/1983 | Yamamoto | 524/456 |

Primary Examiner—Ellis P. Robinson
Attorney, Agent, or Firm—Gary, Juettner & Pyle

[57] ABSTRACT

A wet friction material composition for use in clutches, brakes and the like is composed of a resilient binder comprising a fluoroelastomer. The friction material is characterized by containing a significant amount of wollastonite as a filler, which unexpectedly alters the ratio between the dynamic and static coefficients of friction exhibited by the friction material during actual use.

9 Claims, 6 Drawing Figures

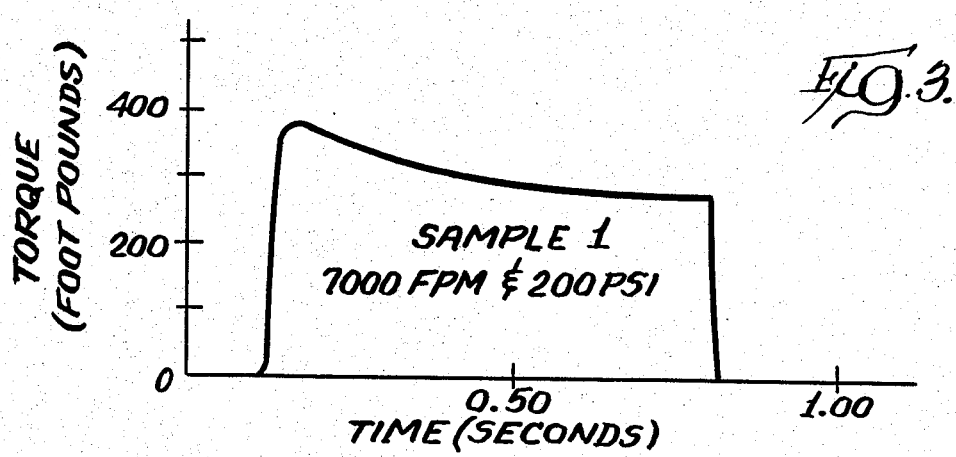
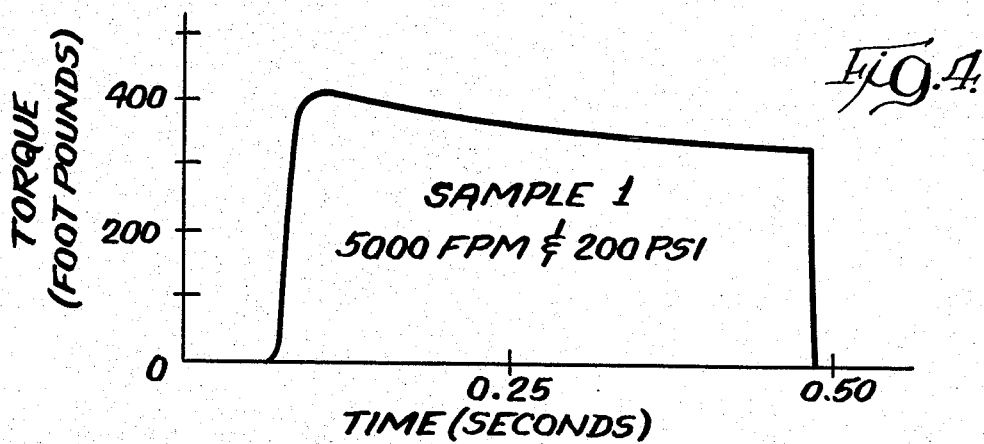
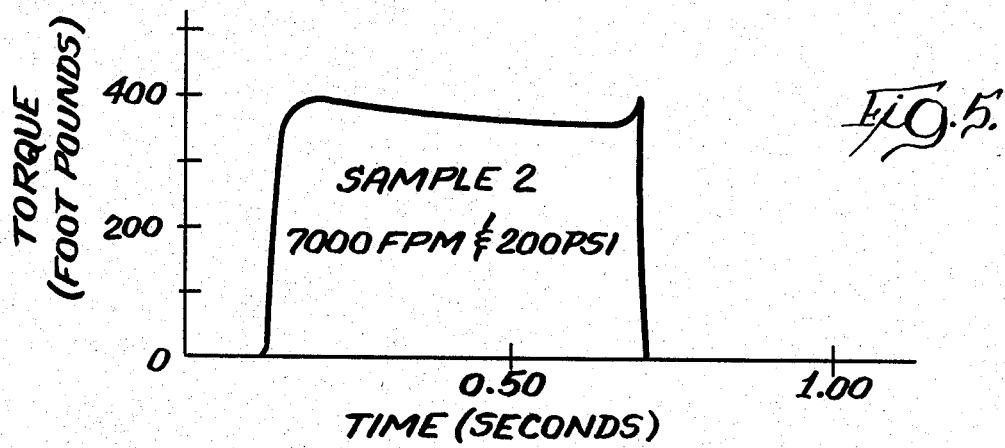
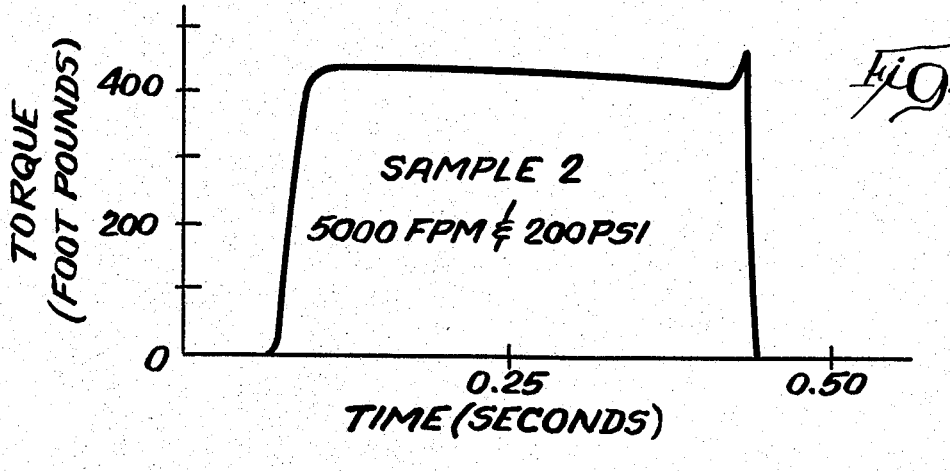

FLUOROELASTOMER-BASED FRICTION MATERIAL HAVING IMPROVED FRICTIONAL PROPERTIES

BACKGROUND OF THE DISCLOSURE

This invention relates to improvements in elastomer-based friction materials and more particularly to such friction elements, i.e., clutch, brake and the like, which run in oil and are referred to in the art as wet friction materials. In a typical application a specially prepared or compounded friction element, in the form of a disc, ring or band, is secured to a rigid backing plate, and the supported element is brought into engagement with a relatively moving reaction member to achieve power transfer or braking action.

Prior art wet friction elements have traditionally been composed of materials such as resin-impregnated paper, sintered bronze, or from a bonded mixture held together by a resin binder. Although such materials have proved to be highly useful over a wide variety of applications, the advent of larger and more powerful industrial vehicles has created for materials having improved energy absorption rates, better wear resistance, and a long service life at high operating temperatures.

More recently, certain elastomers have been used as a primary component and binder in wet friction materials, for example, as described in U.S. Pat. Nos. 3,898,361, 4,042,085, 4,045,402 and 4,131,590. Elastomer-based materials offer several potential advantages, inasmuch as the material offers greater elasticity than traditional materials and therefore exhibits better energy absorption rates. The relatively low modulus of the material may also allow the material to conform better to irregular or uneven surfaces of the reaction member without undue wear.

Of the conventional elastomers currently available, those offering high temperature stability and good oil resistance are generally preferred, such as cured nitriles and fluoroelastomers. As described in the foregoing patents, the elastomers may be compounded with organic and inorganic fibers for reinforcement, as well as relatively abrasive and non-abrasive fillers or socalled friction modifiers, and the elastomer is then cured to form a substantially uniform matrix with the fibers and fillers in the shape of a disc or pad.

In the testing of elastomer-based friction materials, it is commonly assumed that, for a given level of force, the static coefficient of friction will typically be substantially greater than the dynamic coefficient of friction, wherein the parts are still sliding against one another. In practical terms, if there is a large disparity between the static and dynamic coefficients of friction, the parts will tend to sieze up abruptly shortly before complete engagement. This in turn may cause the engagement to be unacceptably jerky and may cause chatter and noise.

In some applications, a smooth engagement throughout various levels of energy would be desirable, but heretofore in the case of fluoroelastomer-based materials, the static coefficient has been considerably higher than the dynamic, regardless of how the material was compounded and regardless of which materials, i.e., fibers and fillers, were used in combination with the elastomer.

SUMMARY OF THE INVENTION

The present invention is based on the surprising discovery that the use of significant amounts of powdered wollastonite as a filler in a fluoroelastomer based friction material unexpectedly causes the static coefficient of friction and the dynamic coefficient of friction to become more equal, such that with proper levels of wollastonite, the ratio between such coefficients approaches one. While the reason for this result is presently unknown, such result has highly valuable practical applications for the custom design of a friction material for a particular application, i.e., where a smoother, quieter engagement is desired.

The wollastonite is incorporated into the uncured elastomer along with any other desired reinforcing materials and fillers, and the elastomer is then shaped and cured.

THE DRAWINGS

FIGS. 3, 4, 5 and 6 are graphs plotting the torque tracings of the friction materials described herein.

DESCRIPTION OF THE PREFERRED EMBODIMENTS

Figure 1:
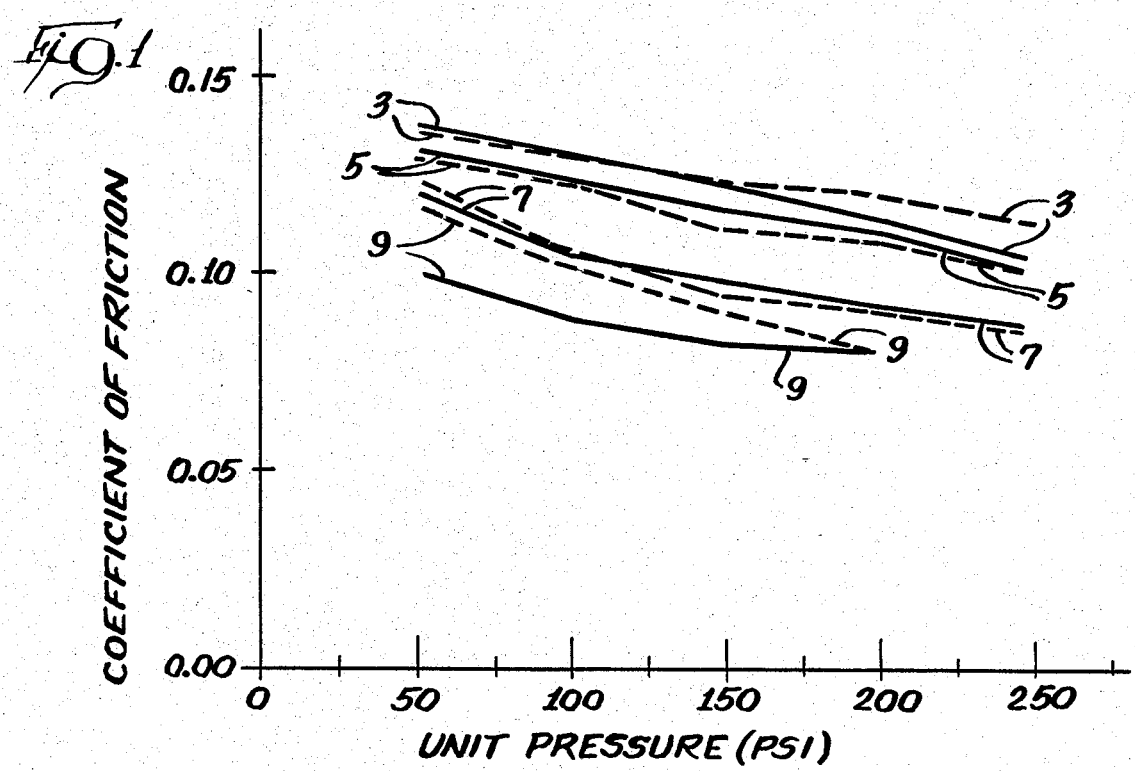
FIGS. 1 and 2 are graphs plotting the static and dynamic coefficients of friction of friction materials described herein.

In accordance with the present invention, an elastomer, preferably a fluoroelastomer or another elastomer mixed with a fluoroelastomer, is used as the primary binder or base for a wet friction material. The elastomer is compounded to contain an effective amount of wollastonite, which is an amount required to reduce the static relative to the dymanic coefficient of friction in the resultant material. Other additives such as fibers and fillers may be included but are considered optional for the purpose of the present invention.

The term "fluoroelastomer" as used herein include all presently known materials classified as elastomers and containing fluoride groups. Fluoroelastomers currently known and available include copolymers of vinylidene fluoride and hexafluoropropylene, terpolymers of vinylidene fluoride, hexafluoropropylene and tetrafluoroethylene, and alternating copolymers of propylene and tetrafluoroethylene. Such fluoroelastomers are available commercially under the trademarks "VITON", "FLUOREL", "AFLAS" and the like. Such fluoroelastomers have excellent solvent and oil resistance and also have a relatively high temperature resistance compared to other available elastomers. The fluoroelastomer is preferably the only binder in the system, but other binders, such as other elastomers and/or curable organic resins or inorganic binders, may be employed.

Amounts of components listed herein will be in terms of percentage by volume rather than the more commonly used percentage by weight. This is done to make the description more aptly reflective of the actual characteristics of the friction material in terms of the various components, irrespective of specific gravities of individual components, since the volume, rather than the weight, of each component is more meaningful in terms of the geometry and exposed working surface of the friction material.

The amount of elastomer employed is preferably above the minimum required to mechanically bond all of the other solid materials together in the finished product, and a minimum of at least 20 percent by volume elastomer will normally be required for this purpose.

The other significant material used in the present composition is wollastonite, which is a mineral otherwise called tabular spar defined as calcium silicate ($CaSiO_3$), having a specific gravity in the order of 2.9 and a hardness of approximately 4.5 moh. Preferably, the wollastonite is used in powdered or particulate form, wherein the particles are smaller than 300 mesh, and the average aspect ratio (length to diameter) is in the order of from about 3 to one to as high as 15 to one, with most grades having aspect ratios of from about 3–5 to one.

As stated herein before, the amount of wollastonite included in the composition is that amount desired to produce the desired altered friction characteristics of the final material. In general, the total composition will contain from about 5 to about 35 percent by volume, and preferably in the order of from about 10 to about 25 percent by volume, of the wollastonite.

It has been found that a suitable friction material may be prepared from a compound of the elastomer and wollastonite alone. In order to improve durability and strength of the material, however, and to decrease the total volume of relatively expensive elastomer required, however, other fillers and reinforcing materials will be incorporated into the friction material composition, typically in the form of fibers and/or powdered or particulate fillers. Certain fibers or fillers are known to augment the overall friction properties of the material, for example, a relatively hard or sharp particle or fiber, although such conventional additives are not known or used to significantly alter the ratio of the static to dynamic coefficient of friction.

Suitable fibers that may be incorporated into the material include, for example, organic and inorganic fibers, such as carbon fibers, carbon fiber precursers, other polymer fibers, and cotton, asbestos, glass, ceramic, mineral, metallic and others. Fibers serve to provide a reinforcing matrix and generally improve useful service life of the material. If fiberous materials are employed, they may be present in an amount of from about 5 to about 40 percent by volume.

Various types of fillers may also be incorporated in the composition, and numerous types of fillers are available for this purpose. Furthermore, it is known that some fillers may be used as lubricants, some may be used as abrasives, while others are relatively neutral and serve primarily as fillers. Typical fillers, for example, which may be included in the present composition include barium sulfate, molybdenum disulfide, alumina, silica, petroleum coke, graphite, carbon black, powdered metals, powdered polymers, mixtures thereof, and the like. In general, up to at least 60 to 70 percent of the volume of the material, including the wollastonite, may comprise fillers, whereas the other fillers used as abrasives would normally be used in lesser amounts, i.e., less than 20 percent.

In addition, minor amounts of conventional accelerators, stabilizers, processing aids and curing agents suitable for the elastomer used may be incorporated into the material.

The uncured fluoroelastomer, wollastonite, and any fibers, fillers and curatives are then thoroughly mixed together by a suitable technique, such as by compounding in a Banbury mixer, such that the additives are uniformly dispersed in the elastomer.

Following the mixing procedure, the mixture is formed into the shape of a friction member, typically a pad, a grooved disc or ring shape, and the member is then cured under heat and pressure. Several methods available for this purpose. The material may first be sheeted on a conventional sheeter, cut into the desired shape, and subsequently cured. In the alternative, the material may be extruded or may be molded, such as by injection, compression or transfer molding techniques. Grooves may be imparted in the outside surface of the friction element either by molding or by cutting the grooves in the cured piece.

Regardless of the method used to process the material, it is also necessary to secure the friction element to a rigid backing member such as a steel plate. This may be done either by compression molding the element against the backing member with the addition of a small amount of an adhesion promoter and/or by securing the friction element to the backing member with a suitable adhesive.

The elastomer is cured under conventional conditions depending on the type of elastomer and the curatives employed. Generally, heat and pressure are applied simultaneously, for example, at temperatures of about from 350 to 475 degrees F. and at pressures of from about 50 to about 4,000 pounds per square inch until the elastomer has fully cured.

The cured friction material of the present invention, after being mounted on a backing plate, is typically incorporated into a mechanical assembly having oil circulating therein. The friction plate is brought into and out of engagement with a relatively rotating reaction plate, which may occur at various speeds and pressures.

The friction material of the present invention exhibits substantially uniform levels of friction over wide pressure ranges, with static and dynamic coefficients of friction being in the order of from about 0.05 to 0.25. Moreover, however, the addition of wollastonite uniquely serves to lower the static coefficient of friction relative to the dynamic coefficient over the entire range of operating conditions, such that with proper compounding, the ratio between the two values approaches one. This allows the friction member to be capable of smoother engagements with the reaction member without excessive noise or chatter.

It will be appreciated that the measured levels of static and dynamic coefficients of friction vary with pressure, speed, and other factors. Also, even though a standard measurement technique is employed, the numerous variables involved make it difficult to quantify these values with great or reproducible exactitude. Nevertheless, comparative testing under similar conditions clearly indicates that the addition of wollastonite causes the level of static friction to more closely resemble the level of dynamic friction, with the attendant beneficial results hereinbefore described.

The following comparative example is illustrative of the friction material of the present invention and its unique properties.

EXAMPLE I

The following two batches of materials were prepared by identical methods and were processed into finished friction discs of identical size and groove pattern. In general, each batch was mixed in a Banbury mixer, the mixture was then sheeted to a given thickness, and the sheet was cut into rings of equal size. The rings were applied against a steel backing plate and bonded and cured under 100 psi for 15 minutes at 350° F. and post cured at 400° F. for 24 hours.

|  | Sample 1 | | Sample 2 | |
| --- | --- | --- | --- | --- |
|  | Vol. % | Weight % | Vol. % | Weight % |
| Fluoroelastomer (Viton E-60) | 48.81 | 43.46 | 48.82 | 47.34 |
| Graphite Fiber (Thornel VMD) | 29.33 | 28.55 | 29.33 | 31.10 |
| Wollastonite (Nyad 400) | 15.19 | 21.56 | — | — |
| Carbon Black (N-990) | — | — | 15.19 | 14.57 |
| Bonding agents and Curatives | 6.66 | 6.43 | 6.66 | 6.99 |

It may be seen that the above formulations were substantially identical, except that Sample 1 contained wollastonite and Sample 2 contained carbon black as a filler instead of wollastonite.

The friction elements from each of Samples 1 and 2 were subjected to identical testing on a dynamometer to determine the static and dynamic coefficients of friction over a range of speeds and unit pressures.

Figure 2:
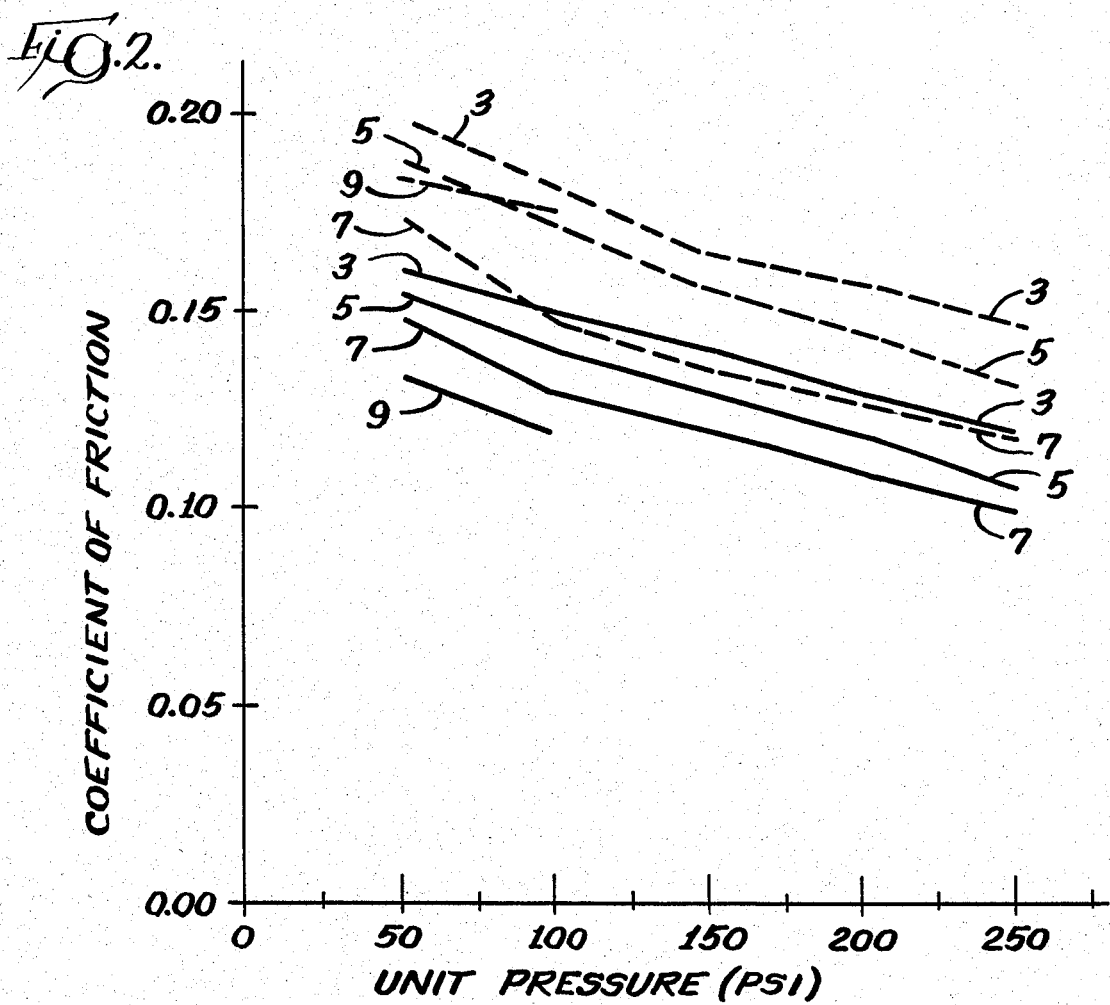

The results of the tests on Samples 1 and 2 are illustrated in FIGS. 1 and 2, respectively. The dotted lines indicate the static coefficient, and the solid lines indicate the dynamic coefficient. The numbers within each graph indicate that measurements were made at 3,000, 5,000, 7,000 and 9,000 feet per minute.

In comparing FIGS. 1 and 2, it will be noted that in the case of the material containing wollastonite (FIG. 1), the static and dynamic coefficients of friction at the various speeds are very close in value. In contrast, the respective coefficients for Sample 2 (FIG. 2) at the various speeds are more widely separated, with the static coefficient being significantly higher than the dynamic value. The values shown in FIG. 1 will allow for a smoother engagement than the values shown in FIG. 2, the latter being typical of conventional fluoroelastomer friction materials.

FIGS. 3 and 4 are representative torque traces for Sample 1, and FIGS. 5 and 6 are torque traces, under the same conditions, for Example 2. In FIGS. 3 and 5, the evaluation was made at 7,000 feet per minute and 200 psi; and in FIGS. 4 and 6, the evaluation was at 5,000 fpm and 200 psi.

The figures illustrate the torque, in foot pounds, over a period of time, as the friction material is brought into frictional engagement with a relatively stationary mating member. For example, in FIG. 3, the torque increases to about 400 as the members are first engaged and later decreases to zero at about 0.8 seconds when the members are fully engaged.

FIGS. 5 and 6 illustrate torque tracings that would be typical of a conventional fluoroelastomer friction material. The area of interest in the tracing is shortly before full engagement. If there is a disparity in the dynamic and static coefficients of friction, i.e., dynamic is lower than static, there will be an abrupt increase in torque shortly before full engagement, as illustrated. This so-called "rooster tail" effect may be very undesirable where smooth engagements are required, as discussed previously.

In connection with the friction material of the present invention, as represented in FIGS. 3 and 4 there is no similar increase in torque shortly before engagement, thus allowing for smooth engagements.

We claim:

1. An improved elastomeric friction material wherein the material is mounted on a rigid backing member and brought into frictional engagement with a relatively moving reaction member, said friction material comprising a cured fluoroelastomer and wollastonite dispersed therein, said material and having a static and dynamic coefficient of friction of from about 0.05 to 0.25, said wollastonite being present in an amount sufficient to reduce the level of the static coefficient relative to the dynamic coefficient of friction such that the ratio of said coefficients approaches one, whereby said fraction material exhibits smooth frictional engagement with said reaction member.

2. The friction material of claim 1 wherein said wollastonite is present in an amount of from about 10 to about 25 percent by volume of said material.

3. The friction material of claim 1 wherein said fluoroelastomer is present in said material in an amount of at least 20 percent by volume.

4. The friction material of claim 1 wherein said fluoroelastomer is selected from the group consisting of copolymers of vinylidene fluoride and hexafluoropropylene, terpolymers of vinylidene fluoride, hexafluoropropylene and tetrafluoroethylene, alternating copolymers of propylene and tetrafluoroethylene, and mixtures thereof.

5. The friction material of claim 1 wherein said material additionally comprises reinforcing fibers.

6. The friction material of claim 5 wherein said fibers comprise inorganic fibers.

7. The friction material of claim 5 wherein said inorganic fibers comprise from about 5 to about 40 percent by volume of said material.

8. The friction material of claim 5 wherein said friction material additionally comprises fillers.

9. An improved elastomeric friction material wherein the material is mounted on a rigid backing members and brought into frictional engagement with a relatively moving reaction member, said friction material comprising at least 20 percent by volume fluoroelastomer as a binder, from about 10 to about 25 percent by volume wollastonite, from about 5 to about 40 percent by volume reinforcing fibers, and from zero to about 60 percent fillers, said wollastonite serving to lower the static coefficient of friction relative to the dynamic coefficient of friction of said material, such that the ratio of said coefficients approaches one.

* * * * *